June 28, 1966  C. R. MELDRUM  3,257,982
MINIATURE SUBMERSIBLE VEHICLE

Filed July 30, 1963  10 Sheets-Sheet 1

INVENTOR.
CHARLES R. MELDRUM
BY
Donnelly, Mentag & Harrington
ATTORNEYS

INVENTOR.
CHARLES R. MELDRUM
BY
Donnelly, Mentag & Harrington
ATTORNEYS

June 28, 1966 C. R. MELDRUM 3,257,982
MINIATURE SUBMERSIBLE VEHICLE
Filed July 30, 1963 10 Sheets-Sheet 3

INVENTOR.
CHARLES R. MELDRUM
BY
Donnelly, Mentag & Harrington
ATTORNEYS

June 28, 1966    C. R. MELDRUM    3,257,982
MINIATURE SUBMERSIBLE VEHICLE
Filed July 30, 1963    10 Sheets-Sheet 4
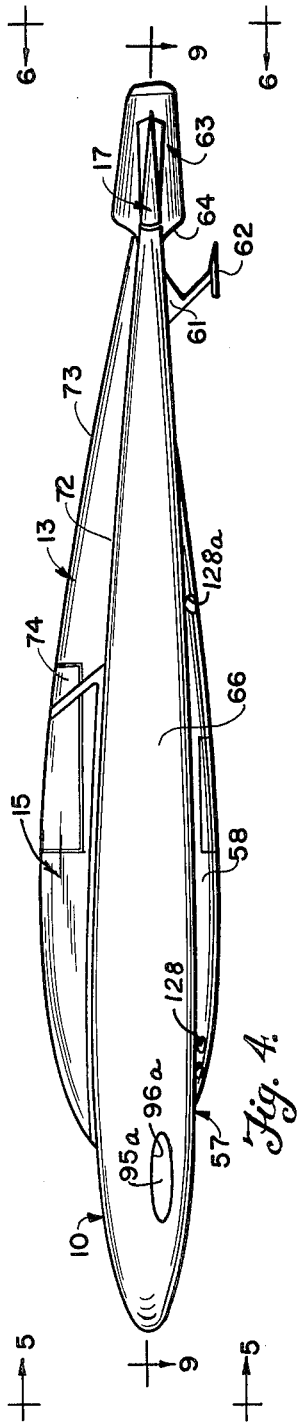
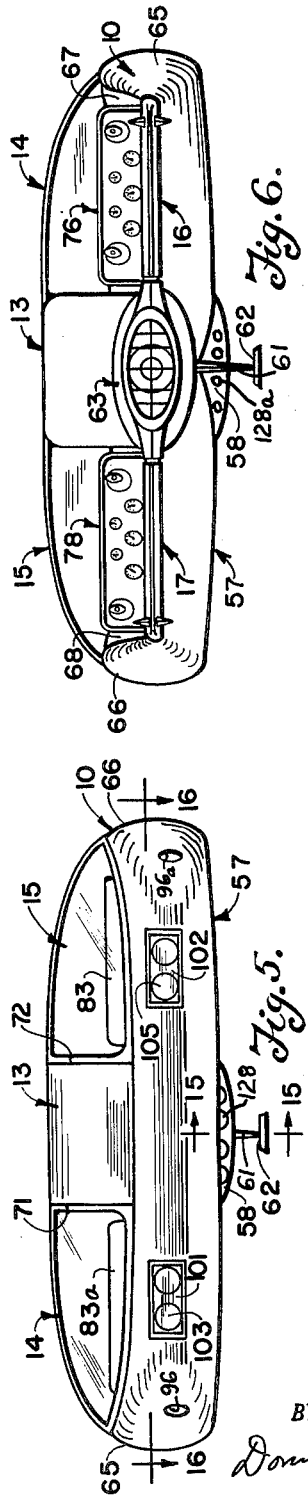
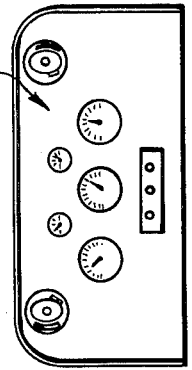
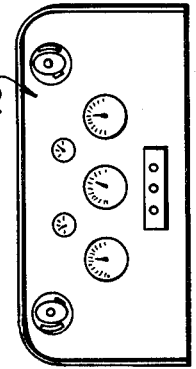
INVENTOR.
CHARLES R. MELDRUM
BY Donnelly, Mentag & Harrington
ATTORNEYS INVENTOR.
CHARLES R. MELDRUM
BY
Donnelly, Mentag & Harrington
ATTORNEYS

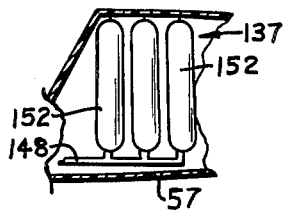
Fig. 10.
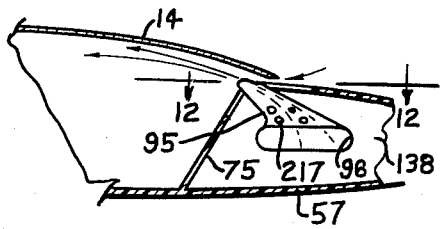
Fig. 11.
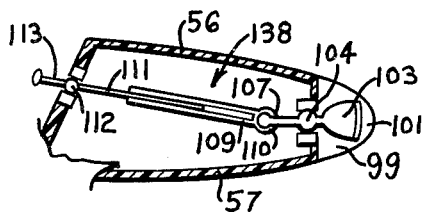
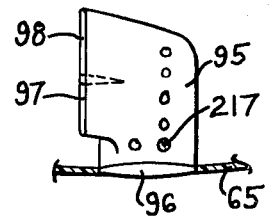
Fig. 12.
Fig. 13.
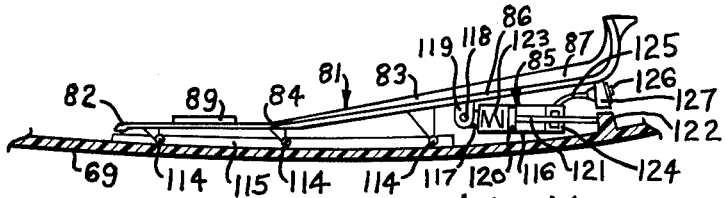
Fig. 14.
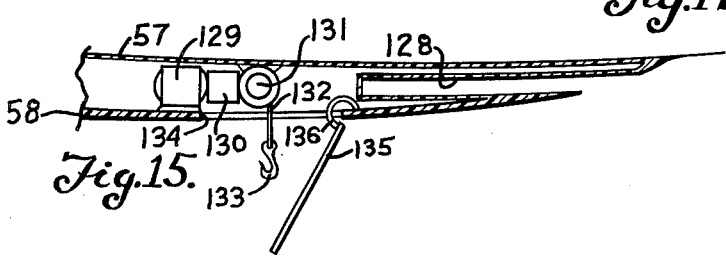
Fig. 15.
INVENTOR.
CHARLES R. MELDRUM
BY
ATTORNEYS

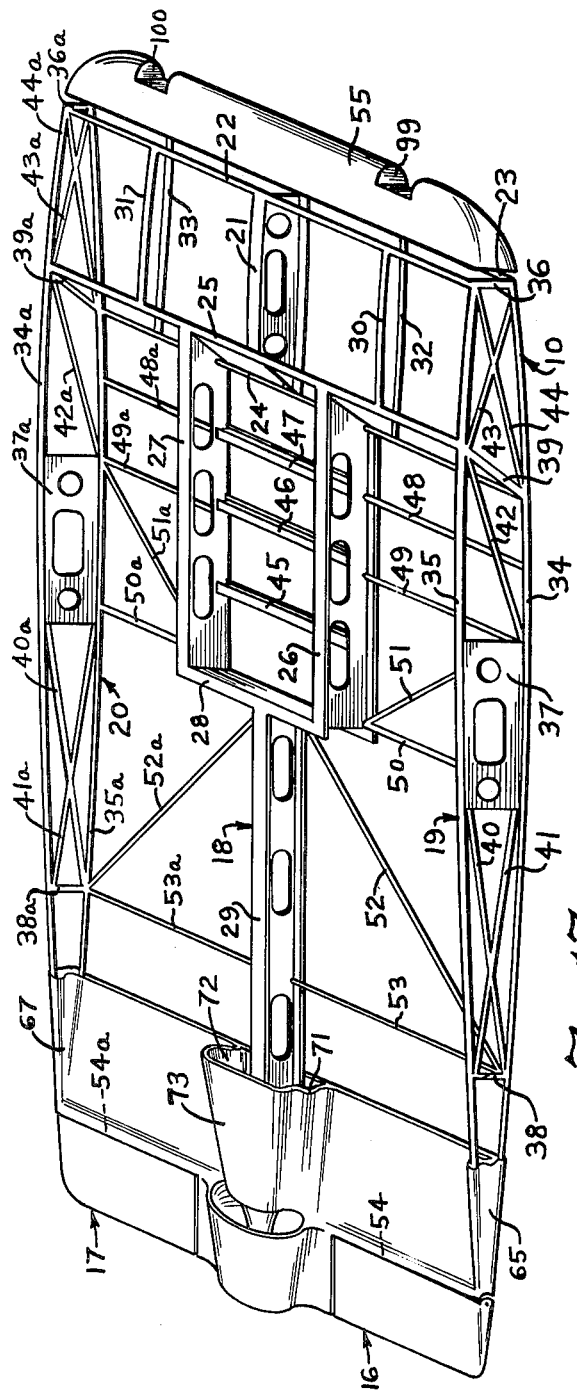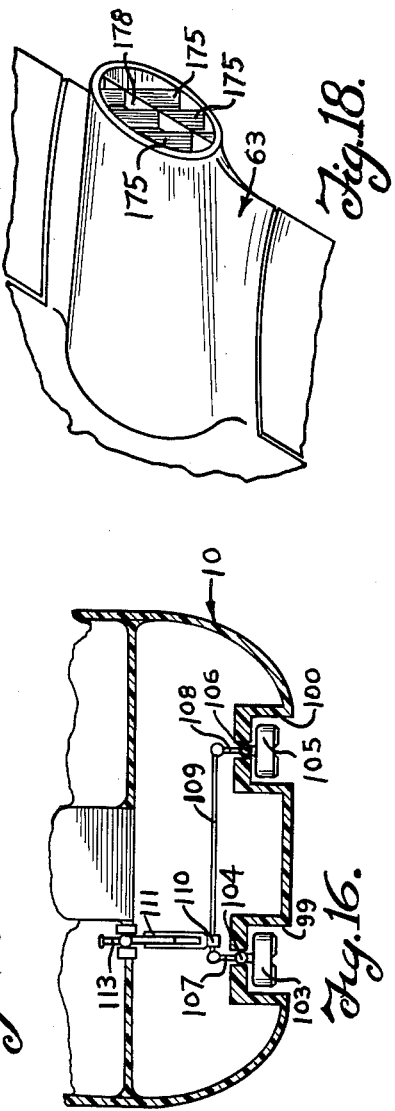

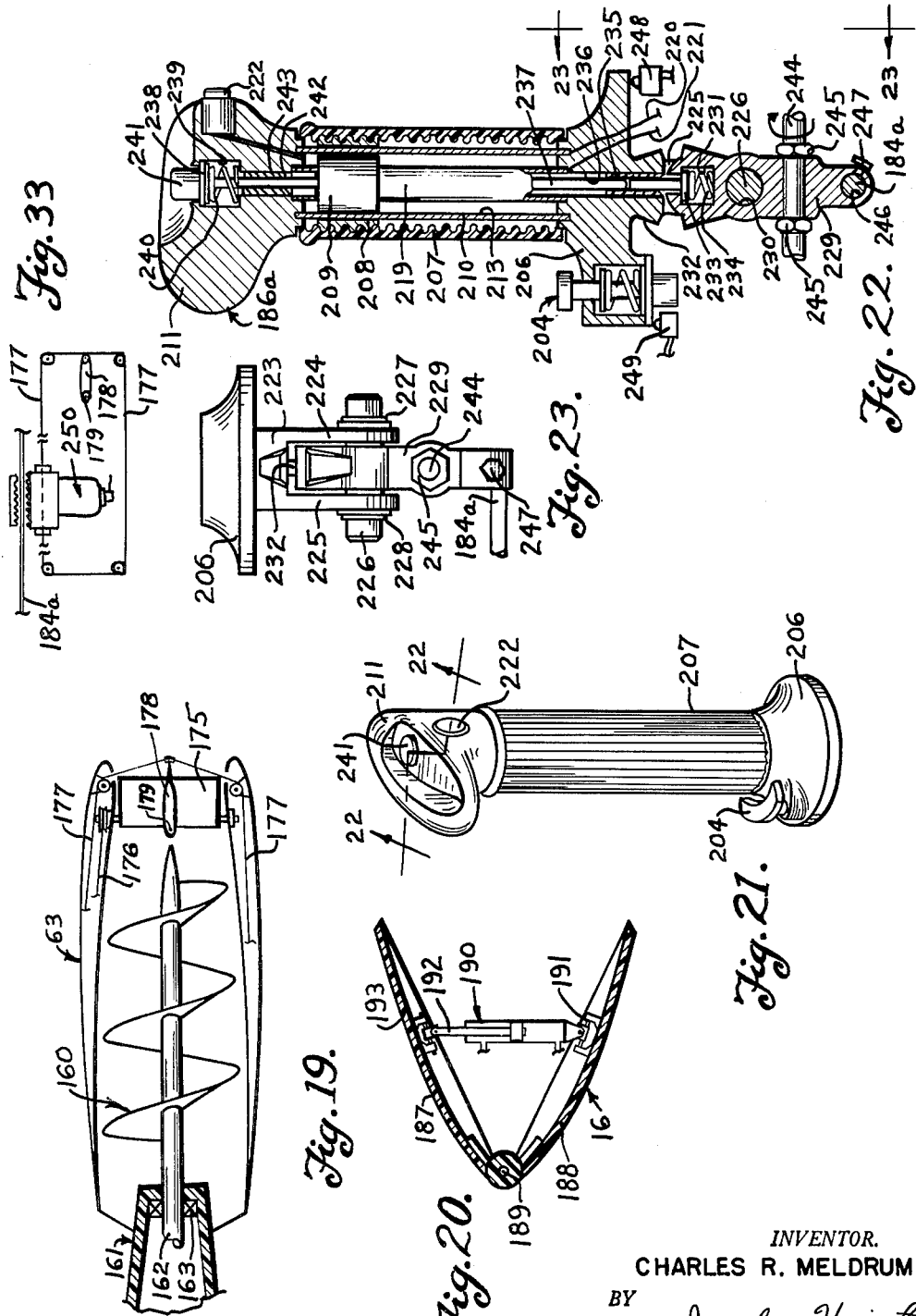

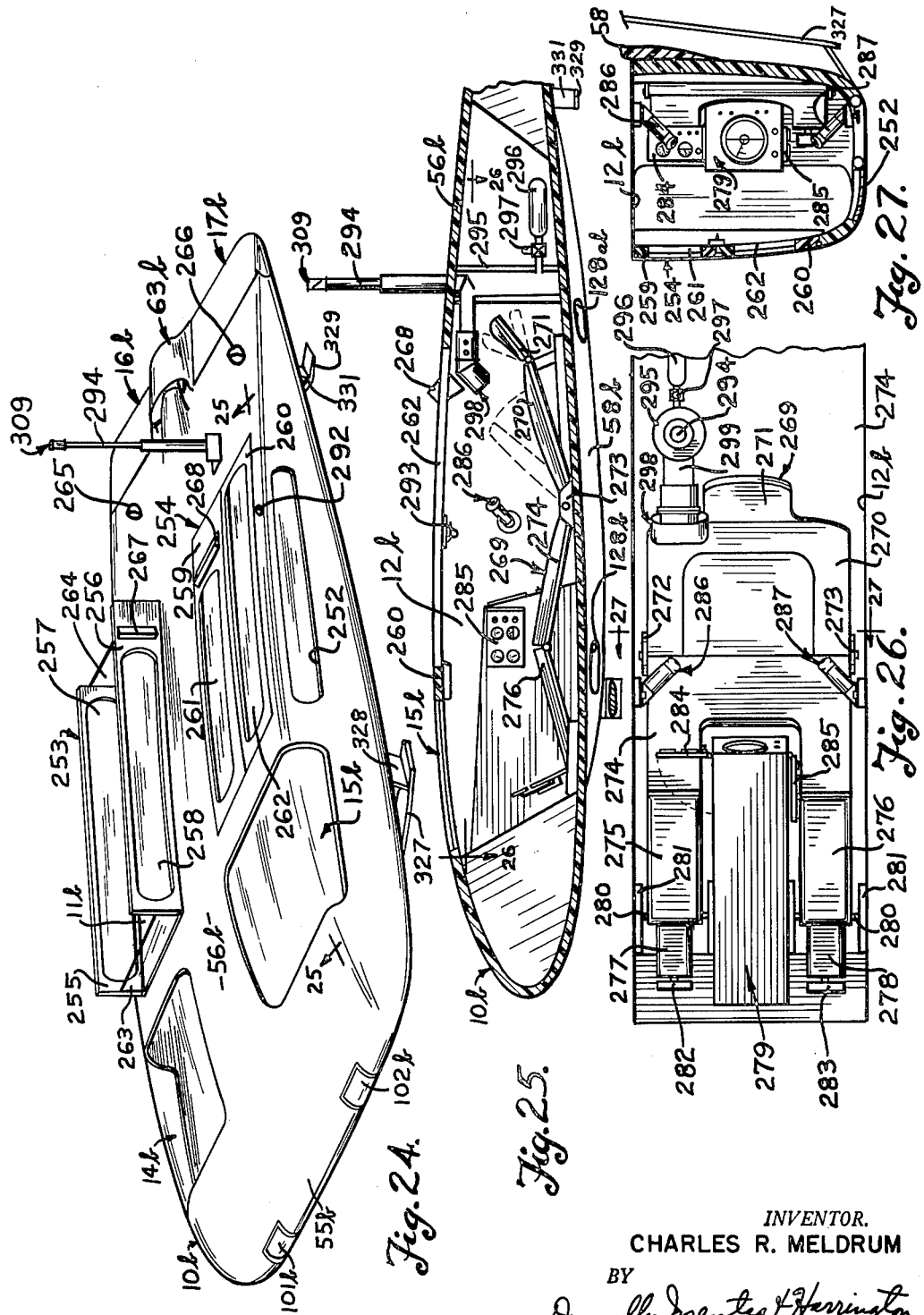

June 28, 1966  C. R. MELDRUM  3,257,982
MINIATURE SUBMERSIBLE VEHICLE
Filed July 30, 1963  10 Sheets-Sheet 10
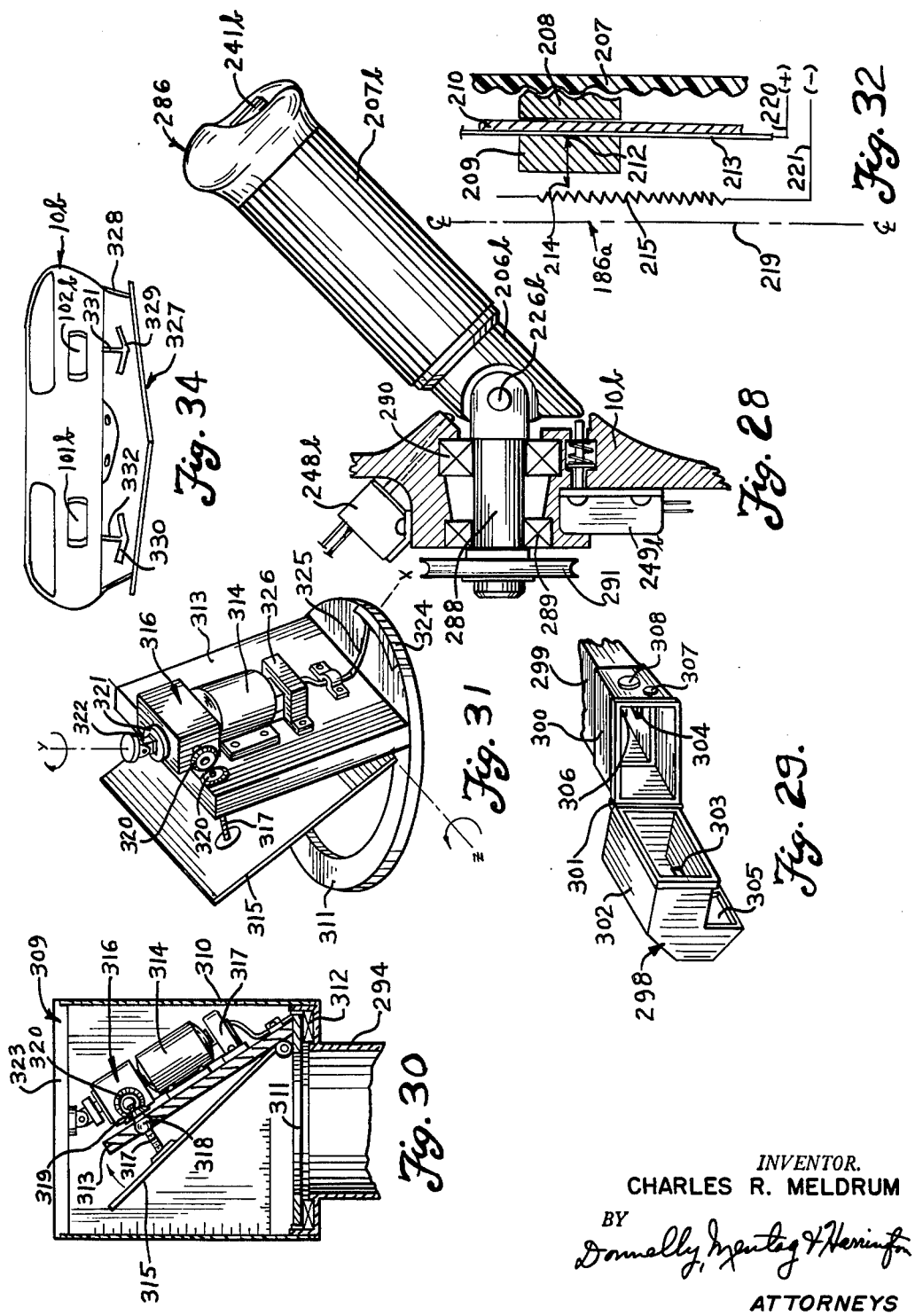
INVENTOR.
CHARLES R. MELDRUM
BY
Donnelly, Mentag & Herrington
ATTORNEYS

United States Patent Office 3,257,982
Patented June 28, 1966

3,257,982
MINIATURE SUBMERSIBLE VEHICLE
Charles R. Meldrum, Detroit, Mich., assignor of one-
fourth to Robert G. Mentag, Detroit, Mich.
Filed July 30, 1963, Ser. No. 298,675
37 Claims. (Cl. 114—16)

This invention relates generally to submersible vehicles, and more particularly to a novel and improved miniature submersible vehicle which is adapted for use in carrying out civilian or military underwater operations.

It is desirable in carrying out different types of civilian and military underwater operations to provide a diver with a vehicle which is capable of transporting the diver and his equipment from a base point to a work operation site in a minimum of time and with efficiency and safety. Many different types of underwater vehicles have been constructed in the past in an attempt to provide an efficient working vehicle for a diver, but such prior art vehicles have been heavy, slow and lacking in good maneuverability characteristics. Accordingly, it is the primary object of the present invention to provide a submersible miniature vehicle which is simple and compact in construction, light in weight, and efficient in operation.

It is another object of the present invention to provide a novel and improved miniature submersible vehicle which is provided with a hull that is wing-shaped to provide optimum characteristics of maneuverability and speed, and which is adapted to be either power driven or towed, and capable of transporting a payload which may include two divers and their operating equipment.

It is a further object of the present invention to provide a novel and improved miniature submersible vehicle which is substantially rectangular in over-all plan configuration with the longer axis of the rectangle being disposed longitudinally of the vehicle, and wherein the vehicle is provided with a side elevational configuration which is wing-shaped with the front end being rounded and the over-all height or vertical dimension of the vehicle hull being greater at the forward end thereof and tapering toward the rear end thereof to a point to provide a streamlined longitudinal configuration, and which vehicle includes a centrally disposed, longitudinally extended housing for various components, a steering means mounted on the aft end of the vehicle, a longitudinally disposed cockpit on each side of said compartment which is occupied by an operator disposed in a prone, sitting or semi-reclined position, and a control means in each of the cockpits for controlling the vehicle from either one of the cockpits.

It is still another object of the present invention to provide a novel and improved miniature submersible vehicle which is capable of carrying a full pay load while performing universal movements, that is, movements in three dimensions which may be directed by a control means with a minimum of effort.

It is still a further object of the present invention to provide a novel and improved miniature submersible vehicle which is constructed and arranged to include two longitudinally disposed, laterally spaced apart, cockpits in which the operators of the vehicle are adapted to be disposed in a prone position for operating the vehicle and wherein the cockpits are enclosed at the forward ends thereof by means of separate swingably mounted canopies and the cockpits are open at the aft ends thereof to permit quick and easy rearward sliding exit from the cockpit without raising the canopies.

It is still another object of the present invention to provide a novel and improved miniature submersible vehicle which is constructed and arranged to include two longitudinally disposed, laterally spaced apart, cockpits in which the operators of the vehicle are adapted to be disposed for operating the vehicle and wherein the cockpits are enclosed by means of swingably mounted hatches and wherein the upper surface of the hull is continuous rearwardly from said hatches to the stern deck in a streamline configuration.

It is a further object of the present invention to provide a novel and improved miniature submersible vehicle which includes a hull having a substantially rectangular plan form with the longer axis thereof being disposed longitudinally of the vehicle, said hull being provided with a wing-shaped side elevational form with the front end of the vehicle being rounded and the over-all height of the hull being at a maximum at the forward end thereof and tapering toward the rear end thereof to provide a streamlined longitudinal configuration, said hull including a centrally disposed, longitudinally extended component compartment, a longitudinally disposed cockpit formed in said hull on each side of said component compartment, and, steering means operatively mounted on the rear end of the hull.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 4 is a side elevational view of the structure illustrated in FIG. 2, taken along the line 4—4 thereof and looking in the direction of the arrows;

FIG. 5 is a front elevational view of the structure illustrated in FIG. 4, taken along the line 5—5 thereof and looking in the direction of the arrows;

FIG. 6 is a rear end elevational view of the structure illustrated in FIG. 4, taken along the line 6—6 thereof and looking in the direction of the arrows;

FIG. 7 is an enlarged view of the instrument panel shown on the right side of the structure of FIG. 6, in the compartment on the right side of the hull;

FIG. 8 is an enlarged view of the instrument panel shown on the left side of the structure of FIG. 6, in the compartment on the left side of the hull;

FIG. 10 is a fragmentary, elevational, sectional view of the structure illustrated in FIG. 9, taken along the line 10—10 thereof and looking in the direction of the arrows;

FIG. 11 is a fragmentary, elevational, sectional view of the structure illustrated in FIG. 2, taken along the line 11—11 thereof and looking in the direction of the arrows;

FIG. 12 is a fragmentary, horizontal view of the structure illustrated in FIG. 11, taken along the line 12—12 thereof and looking in the direction of the arrows;

FIG. 13 is a fragmentary, elevational, sectional view of the structure illustrated in FIG. 2, taken along the line 13—13 thereof and looking in the direction of the arrows;

FIG. 14 is a fragmentary, elevational, sectional view, slightly enlarged, of the structure illustrated in FIG. 2, taken along the line 14—14 thereof and looking in the direction of the arrows;

FIG. 15 is a fragmentary, slightly enlarged, elevational, sectional view of the structure illustrated in FIG. 5, taken along the line 15—15 thereof and looking in the direction of the arrows;

FIG. 16 is a reduced, fragmentary, horizontal, sectional view of the structure illustrated in FIG. 5, taken along the lines 16—16 thereof and looking in the direction of the arrows;

FIG. 17 is an elevational view of the structure illustrated in FIG. 1, and showing the outer skin of the vehicle removed so as to show the structural frame work of the hull of the vehicle;

FIG. 18 is an enlarged, elevational, perspective view of the shroud structure mounted around the vehicle's spiral propeller, taken in the direction of the arrow marked "18" as shown in FIG. 1;

FIG. 19 is an enlarged, fragmentary, elevational, sectional view of the vehicle's spiral propeller and shroud structure, taken substantially along the line 19—19 of FIG. 1, and looking in the direction of the arrows;

FIG. 20 is a fragmentary, slightly enlarged, elevational sectional view of the hydro-brake structure illustrated in FIG. 1, taken along the line 20—20 thereof, and looking in the direction of the arrows and showing the hydro-brake in the open position;

FIG. 21 is an elevational view of the unified control handle employed in the control system of the vehicle of the present invention;

FIG. 22 is an enlarged elevational, sectional view of the structure illustrated in FIG. 21, taken along the line 22—22 thereof and looking in the direction of the arrows;

FIG. 23 is a fragmentary, elevational, broken view of the structure illustrated in FIG. 22, taken along the line 23—23 thereof and looking in the direction of the arrows;

FIG. 24 is an elevational perspective view of another embodiment of the invention wherein the canopy and structure of the top deck extends for the entire length of the hull;

FIG. 25 is a fragmentary, slightly enlarged, elevational sectional view of the structure illustrated in FIG. 24, taken substantially along the line 25—25;

FIG. 26 is a fragmentary, slightly enlarged, horizontal view of the cockpit structure shown in FIG. 25, with the top deck removed, taken substantially along the line 26—26 of FIG. 25, and looking in the direction of the arrows;

FIG. 27 is an elevational sectional view of the structure illustrated in FIG. 26, taken substantially along the line 27—27, and looking in the direction of the arrows;

FIG. 28 is an enlarged side elevational view of one of the control handles employed in the control system of the embodiment of FIGS. 24 through 27;

FIG. 29 is an elevational perspective view of the power means for adjusting the periscope mirror;

FIG. 30 is a fragmentary perspective view of the periscope visor swung to the inoperative position;

FIG. 31 is a fragmentary elevational view of the rotatable periscope mirror;

FIG. 32 is a fragmentary, enlarged cross-sectional view of the unified control handle construction shown in FIG. 22;

FIG. 33 is a schematic illustration of a means for operating the horizontal rudder 178; and, FIG. 34 is a front elevational view of a second embodiment of the invention which is provided with hydrofoils.

Figure 1:
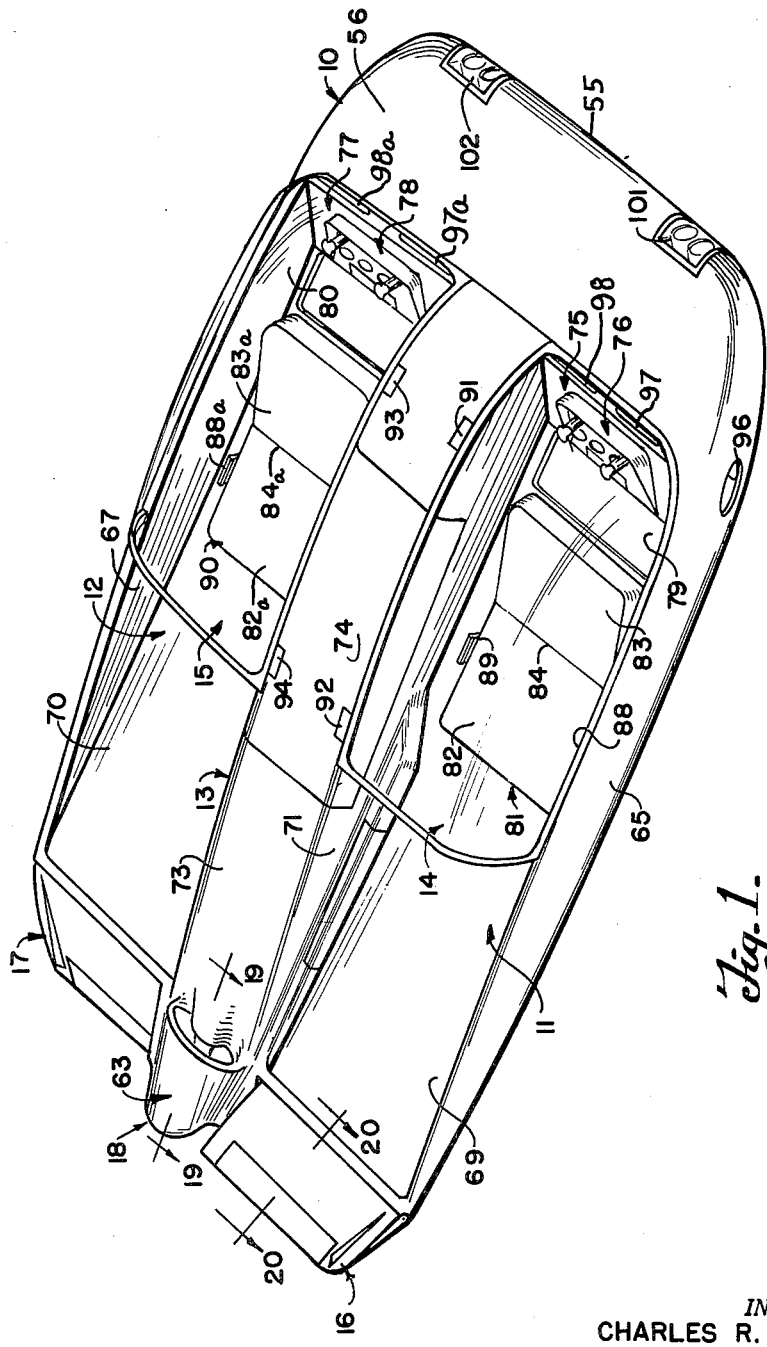
FIG. 1 is an elevational perspective view of a miniature submersible vehicle made in accordance with the principles of the present invention.
Figure 2:
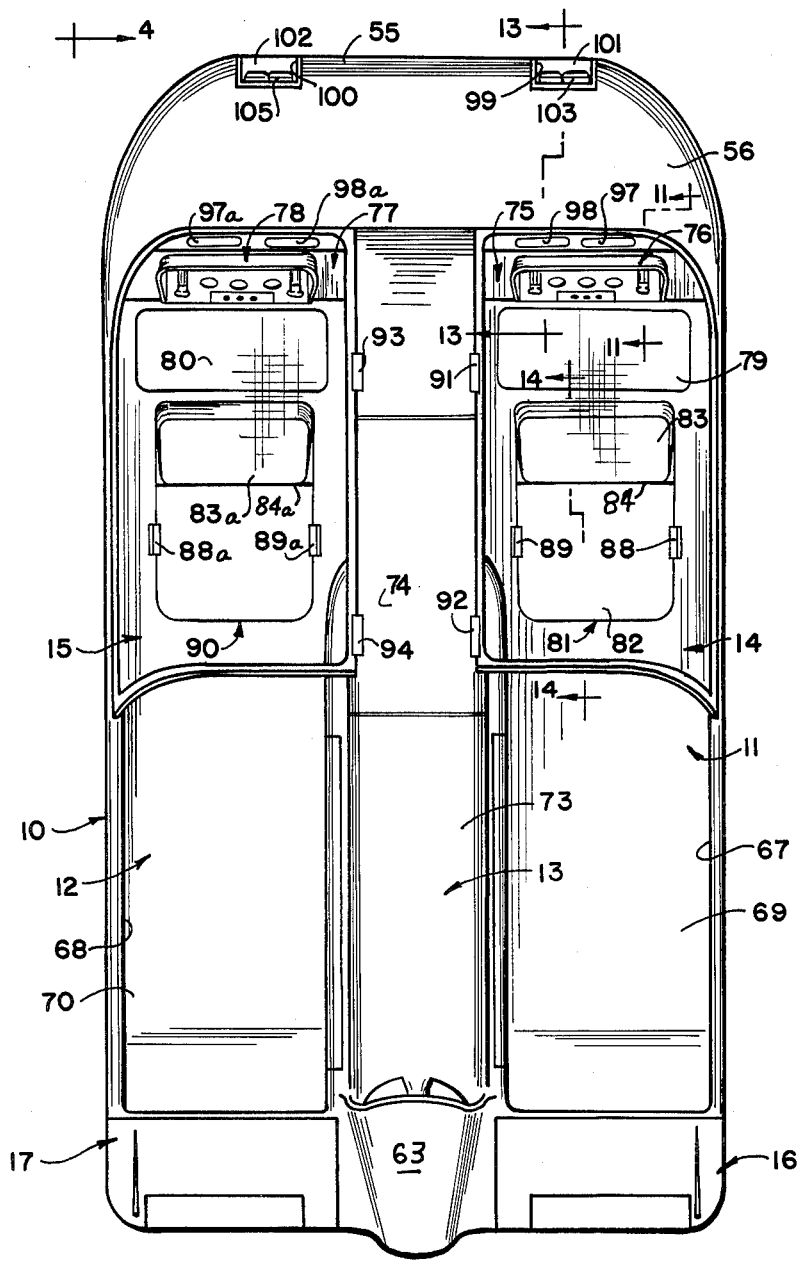
FIG. 2 is a top plan view of the structure illustrated in FIG. 1.
Figure 3:
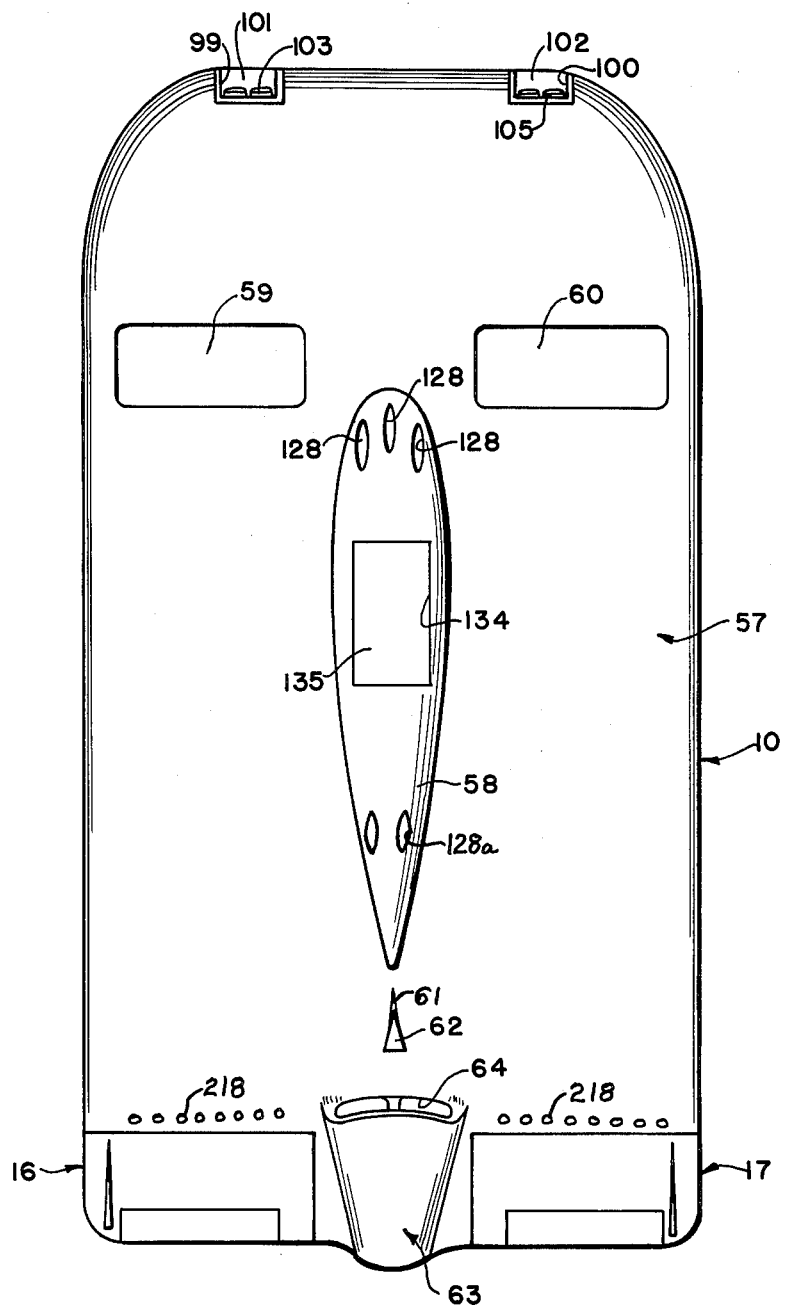
FIG. 3 is a bottom plan view of the structure illustrated in FIG. 1.

Referring now to the drawings and in particular to FIGS. 1 through 6 and 17, the numeral 10 generally indicates the hull of the submersible vehicle of the present invention. The hull 10 is substantially rectangular in over-all plan configuration with the longitudinal axis thereof being disposed along the larger dimension of the rectangular shape. A side view of the vehicle is shown in FIG. 4 and it is substantially shaped as an airfoil with the front end of the vehicle or bow being rounded for optimum fluid flow conditions and with the rear end or stern end of the vehicle tapering to a substantially V-shaped edge as in an airfoil. As shown in FIG. 3, the submersible vehicle of the present invention is wider than its height as compared to the side view of FIG. 4. The aforedescribed over-all configuration of the vehicle produces an over-all configuration which may be termed a seawing shape or outline.

The hull 10 is made from a framework of metal I-beams and tubular structures covered with a smooth skin of molded, high strength and corrosion resistant material as, for example, a plastic material as fiber glass impregnated with a suitable resin. As shown in FIG. 2, the hull 10 includes the longitudinally disposed cockpits generally indicated by the numerals 11 and 12 and these cockpits are disposed along the outer sides of the vehicle. A longitudinally extended, centrally disposed component compartment generally indicated by the numeral 13 divides the cockpits 11 and 12. The cockpits 11 and 12 are provided with the canopies generally indicated by the numerals 14 and 15, respectively, on the forward ends thereof. The vehicle is provided with a pair of elevons, generally indicated by the numerals 16 and 17, for maneuvering the vehicle. The term "elevon" is used in delta wing aircraft work and consists of two control surfaces on the trailing edge of the wings acting as a combination of the elevator and aileron in dihedral position.

As shown in FIG. 17, the submersible vehicle of the present invention includes a hull frame comprising the keel generally indicated by the numeral 18 and the outer laterally disposed side frames generally indicated by the numerals 19 and 20. The keel 18 is the main longitudinal strength member and the two outwardly or laterally disposed side frames 19 and 20 are the secondary longitudinal strength members of the vehicle frame. As shown in FIG. 17, the keel is made up of three different sections including the front centrally disposed, longitudinally extended short I-beam portion 21 which is fixedly connected by any suitable means to the vertically spaced apart transversely extended tubular members 22 and 23 at the front end of the I-beam 21. It will be understood that the transverse tubular members 22 and 23 may be made from a suitable metal or plastic material and would be fixedly connected to the I-beam 21 as by welding or suitable adhesion method depending upon the material used. It will also be understood that the metal parts of the following described frame structure may be molded within a suitable covering of high strength and corrosion resistant material of the type used for the hull skin.

The keel I-beam 21 is connected at the rear end thereof to the pair of transversely extended vertically spaced apart tubular members 24 and 25. The rear end of the I-beam 21 tapers downwardly and rearwardly and the lower tubular member 24 is fastened to the lower end of the tapered rear end of the I-beam 21 and the tubular member 25 is fastened at the upper end of the tapered end. The keel 18 further includes the pair of longitudinally extended spaced apart channel members 26 and 27 which are spaced sidewardly from the center line of the vehicle a slight distance and which are connected at the front ends thereof to the tubular transverse members 24 and 25. The rear ends of the metal channels 26 and 27 are connected by the transverse channel member 28. The vehicle keel further includes the centrally disposed, longitudinally extended metal I-beam 29 which is connected at the front end thereof to the transverse channel member 28 and which extends to the rear end of the hull 10.

As shown in FIG. 17, the transverse tubular members 22 and 25 are fixedly interconnected by means of the longitudinally disposed tubular members 30 and 31. The transverse tubular members 23 and 24 are also similarly connected by means of the longitudinally extended tubular members 32 and 33.

The side frame 19 comprises the lower longitudinally extended tubular member 34 which has the front and rear ends thereof formed so as to slope upwardly to provide the lower edge of the frame with an arcuate or downwardly curved lower configuration. The side frame 19 further includes the upper tubular longitudinally extended member 35 which is disposed vertically over the tubular member 34 and which slopes downwardly, rearwardly toward a converging point at the forward end of the elevon 16. The front end of the upper tubular member 35 tapers downwardly slightly and is joined by means of the vertical tubular member 36 with the front end of the lower tubular member 34. A vertically disposed stiffener plate 37 is fixedly mounted at a point centrally of the tubular members 34 and 35 and in a vertical position so as to interconnect the two longitudinal tubular members. The longitudinal tubular members 34 and 35 are further interconnected by a plurality of vertical tubular members as 38 and 39. The longitudinal tubular members 34 and 35 are further interconnected by means of a plurality of diagonally disposed interconnecting tubular members as 40, 41, 42, 43 and 44.

The longitudinal frame member 19 may be termed the right side longitudinal member and the member 20 may be termed the left side longitudinal frame member. The left side longitudinal frame member 20 is constructed in the same manner as the aforedescribed longitudinal frame member 19 and the corresponding parts have been marked with similar reference numerals followed by the small letter "a." As shown in FIG. 17, the transverse tubular members 22, 23, 24 and 25 are fixedly connected at their outer ends thereof to the side longitudinal members 19 and 20. The hull frame includes a plurality of interconnecting transverse tubular members as described hereafter. The longitudinally extended keel channel members 26 and 27 are fixedly interconnected by means of the transversely extended, longitudinally spaced apart, horizontal bars 45, 46 and 47. The side longitudinal frame member 19 is connected between the lower tubular member 34 thereof and the keel channel member 26 by means of the longitudinally spaced apart tubular members 48, 49, 50 and 51. The side frame lower tubular member 34 is also interconnected with the keel I-beam 29 by means of the transverse tubular member 53 and the diagonally disposed tubular member 52. The rear ends of the side frames 19 and 20 are suitably interconnected by tubular transverse members as 54 and 54a. The side longitudinal member 20 is also interconnected with the keel in the same manner as the side longitudinal member 19 and the corresponding interconnecting tubular members are marked with similar reference numerals followed by the small letter "a."

As shown in FIGS. 1, 2 and 17, the front end of the hull frame is enclosed by means of a formed hollow bow member 55, which is rounded along the front ends thereof and at the outer ends thereof and which is formed from fiber glass impregnated with resin or a suitable plastic material. The bow member 55 would be molded to the desired shape shown in the drawings. The front end of the hull frame is enclosed on the upper side with a fiber glass impregnated with resin skin to form the foredeck or front of the surface 56. The rest of the skin or covering of the vehicle is also formed from fiber glass impregnated with suitable resin and is molded to the desired curvature and shape as shown in the drawings. FIG. 3 shows the bottom surface of the vehicle to be substantially flat and this surface is indicated generally by the numeral 57 and it tapers upwardly toward the front and rear ends thereof. A downwardly extended appendage or keel portion 58 is molded in the lower surface 57 along the longitudinal center line thereof. The keel portion 58 is rounded at the front end thereof and tapers to a substantial conical meeting point adjacent the rear end thereof. A pair of windows 59 and 60 are provided in the lower surface 57 of the vehicle for observation purposes by the operator and these windows are in alignment with windows formed in the compartments on the upper side of the vehicle as explained hereinafter. As shown in FIGS. 3 and 4, extended downwardly from the bottom surface 57 of the hull adjacent the rear end thereof is an exhaust member 61 from which downwardly extends the skid 62. The propeller shroud, generally indicated by the numeral 63, is conically shaped with the smaller end thereof disposed toward the rear end of the vehicle. As shown in FIG. 3, the propeller shroud 63 is provided with the opening 64 on the bottom side or lower side of the hull 10.

As shown in FIGS. 1 through 6, the outer sides of the longitudinally extended side frames 19 and 20 are covered with the outwardly curved skin portions 65 and 66, and these side skin portions taper to a small height dimension toward the rear thereof in accordance with the shape of the side longitudinal frame members 19 and 20. As shown in FIGS. 1, 2 and 6, the insides of the longitudinal frame members 19 and 20 are covered or enclosed by the skin surfaces or vertical wall portions 67 and 68 which are rounded along the upper edges thereof and are made integral with the outer side walls 65 and 66. The wall portions 67 and 68 form the outer walls of the operator's compartments or cockpits 11 and 12.

As is best seen in FIGS. 1 and 2, the decks 69 and 70 of the cockpits 11 and 12 are formed as a continuation of the over-all skin surface of the vehicle and are made of the same material as previously disclosed for the other surfaces of the vehicle. The cockpit decks 69 and 70 are molded over the top surfaces of the interconnecting tubular transverse members as 48, 49, 50, 51, 52 and 53 and their corresponding parts on the other side of the vehicle followed by the small letter "a." It will be seen that the bottom wall 57 of the vehicle is formed on the lower surface of the last mentioned transverse member and accordingly, the vehicle along the cockpit decks has a thickness substantially equal to the diameters of the last mentioned tubular members. As shown in FIGS. 1, 2 and 5, the centrally disposed component compartment is enclosed by the elongated inverted U-shaped housing which is molded from the same material as the rest of the hull or body and which is provided with the longitudinally extended vertical side walls 71 and 72 and the upper wall 73. The upper wall 73 is convexly curved with the front end thereof tapering downwardly and terminating at the rear surface of the foredeck 56 and with the rear end thereof tapering downwardly and terminating at the rear end of the compartment decks 69 and 70. The component compartment 13 is provided with a detachable waterproof hatch 74 to permit entry into said compartment 13 for service and maintenance purposes.

As shown in FIGS. 1, 2 and 6, the forward end of the cockpit 11 tapers forwardly upwardly as generally indicated by the numeral 75 and mounted therein is the right or starboard control panel generally indicated by the numeral 76. The forward end of the left or port cockpit 12 is also formed with a forward sloping surface generally indicated by the numeral 77 and mounted therein is the port control panel generally indicated by the numeral 78. As shown in FIGS. 1 and 2, a window 79 is formed in the forward end of the cockpit 11, deck 69 adjacent the front end thereof and just to the rear of the control panel 76. A similar window 80 is formed in the deck of the port cockpit 12 at a position immediately to the rear of the control panel 78. The windows 79 and 80 in the decks of the cockpits 11 and 12 are aligned with the windows 59 and 60, respectively, in the bottom surface or skin 57 of the vehicle.

As shown in FIGS. 1, 2 and 14, the starboard compartment 11 is provided with an operator's rest pad generally indicated by the numeral 81 for supporting the body of an operator in the prone position. The rest pad 81 includes the flat portion 82 for supporting the lower portion of an operator's body and the adjustable chest support portion 83 which is adapted to be swung upwardly and downwardly about the hinge 84. The operator rest pad portions 82 and 83 may be formed from any suitable waterproof cushioned material as for example, these rest pad portions may be provided with a fiber glass backing board 86 made from fiber glass impregnated with resin on which is mounted a sponge rubber material or the like as indicated by the numeral 87. The rest pad 81 is held against transverse movement by means of the L-shaped belt locks 88 and 89, as shown in FIG. 1, which overlap the sides of the lower portion of the pad 82 and permit the rest pad to be removed relative thereto longitudinally of the deck 69 by means of the adjustment structure 85. The adjustment structure 85 is a spring loaded mechanism triggered by the button 126 which is fixedly mounted on the depending bracket 127 on the forward part of the chest rest 81. The spring loaded linkage of the device 85 which is made up of appropriate mechanical parts is adapted to move the chest rest pad 81 backwardly and forwardly. The chest rest pad 81 is supported by means of a plurality of rollers 114 which are mounted on the sides of the chest rest pad and which are adapted to be rollably engaged in suitable tracks as 115 which are disposed on each side of the chest rest pad 81. The tracks 115 would be of any suitable type so as to guide the rollers 114 to prevent the rollers from being moved upwardly and out of the tracks 115. The device 85 includes the cylinder 116 which is fixedly connected to the front end of the arm 117. The arm 117 is hingedly connected at 118 to the arm 119 which is fixedly secured to the bottom of the chest rest pad 81. Slidably mounted in the cylinder 116 is a piston 120 to which is fixedly connected the rod 121. The rod 121 has the outer end thereof extended outwardly of the cylinder 116 and is fixedly connected to the abutment 122 which is secured to the deck 69. As shown in FIG. 14, the piston 120 has the spring 123 abutted against the same to provide a spring bias to the left end of the cylinder to move it to the left as shown in FIG. 14. A clamping means 124 is adapted to engage the portion of the rod 121 which extends out of the cylinder 116. The clamping means 124 is mounted in a housing secured to the chest rest pad 81 by means of the hollow rod 125 and the abutment 127. Operatively mounted in the hollow rod 125 is a flexible cable for releasing the clamping means 124. The outer end of the cable is fixedly secured to the release button 126. The device 85 functions to hold the chest rest pad 81 in a forwardly moved position against the pressure of the spring 123. The operator would grasp the chest rest pad 81 and move it forwardly against the pressure of spring 123 and the clamping means 124 would prevent rearward movement of the chest rest pad from the forwardly disposed position. When it is desired to move the chest rest pad rearwardly or to the left as shown in FIG. 14, the operator would press the release button 126 to release the clamping means 124 and the pressure exerted by spring 123 would move the chest rest pad 81 to the left as shown in FIG. 14.

The port cockpit 12 is provided with a similar operator rest pad generally indicated by the numeral 82a, as shown in FIG. 1, and the corresponding parts thereof have been marked with the same reference numerals followed by the small letter "a." It will be seen that when the operator lays in a prone position in either one of the cockpits 11 or 12, he may control the vehicle with efficiency and safety. With the control panels being located just forwardly of the chest rest pad positions, and the windows 59 and 60 just forwardly of the chest pads, the operators may guide the vehicle as desired and yet observe objects which are disposed above, below, in front of, and in back of the vehicle.

The transparent canopies 14 and 15 permit forward vision as well as upward vision. The canopies 14 and 15 are made from any suitable transparent material, as a transparent plastic or the like, and they are curved as shown in FIGS. 1 through 6 to provide streamline waterflow over the same. The rear ends of the canopies 14 and 15 are positioned so as to completely cover the bodies of the operators disposed in the cockpit 11 and 12, and extend over a portion of the legs of an operator. The canopies 14 and 15 shield the operators of the vehicle from obstacle and hydrodynamic forces. It will be seen that the operator or diver in each of the cockpits may emerge from the cockpits by sliding rearwardly out of the cockpits without opening the respective canopy. The canopy 14 is mounted on suitable spring loaded latches or lock mechanisms 91 and 92 which are located on the component compartment 74. The canopy 15 is also provided with similar spring loaded latches or lock mechanisms 93 and 94. It will be understood that by having two cockpits there is enough room to carry cargo or a plurality of operators. To release any load when beneath the surface, the front end of the sub or vehicle could be tipped upwardly to permit the cargo to slide rearwardly and out of the cockpits.

In order to provide an optimum streamline flow of fluid over the upper side of the vehicle, it is provided with a plurality of conduits for passing fluid into the cockpits at the front end thereof and below the canopies. As shown in FIGS. 1, 2, 11 and 12, the vehicle is provided with a fluid intake 96 in the right side wall 65 which is connected to the L-shaped conduit 95. As the vehicle proceeds through a fluid as water the conduit 95 transfers the water into the front end of the cockpit 11. The conduit 95 has the pair of discharge ports 97 and 98 formed in the control panel 75 end thereof for passing water into the front end of the cockpit 11. The passage of water into the cockpit below the canopy 14 provides for streamline flow of water over the top and bottom sides of the canopy and reduces any suction or drag effect caused by the canopy. The port side cockpit 12 is also provided with a similar means for passing water into the front end thereof, and the corresponding parts are indicated in FIGS. 1 and 2 by the same reference numerals followed by the small letter "a." As shown in FIG. 11, the boundary layer control ducts 95 are assisted by a small opening beneath the forward end of the canopy 14 to provide additional flow of fluid under the canopy for pressure balancing purposes.

The submersible vehicle of the present invention is provided with a pair of headlights which are mounted in the front end of the hull as shown in FIGS. 1, 2, 3, 13 and 16. The vehicle hull 10 is provided with a pair of laterally spaced apart headlight cradles 99 and 100, and these headlight cradles are covered by a waterproof plexiglass shield indicated by the numerals 101 and 102, respectively. A first headlight assembly 103 is mounted in the cradle 99 by means of the ball joint assembly 104. A second headlight 105 is mounted in the headlight cradle 100 by means of the ball joint assembly 106. The ball joints 104 and 106 are interconnected by means of the control rods 107, 108 and 109, as shown in FIG. 16. The rod 109 includes a ball joint 110 to which is operatively connected the control rod 111. As best seen in FIG. 13, the control rod 111 has the inner end thereof connected to the ball member 112 which is in turn connected to the control handle or rod 113 located in the cockpit 11. It will be seen that the headlights 103 and 105 may be moved to direct a light beam in any variety of conical patterns by means of the last mentioned rod system or any other suitable control system.

As shown in FIGS. 3, 5 and 6, the vehicle is provided with a plurality of weapon housings which could be used as torpedo tubes and which are indicated by the numerals 128 and 128a, and located in the forward and rear ends respectively, of the keel portion 58. The weapon housings 128 and 128a would be casings or compartments to hold solid fuel propelled torpedos, other suitable weaponry and associated components. FIG. 15 shows a longitudinal sectional view of the central weapon housing 128.

The vehicle is provided with a crane and hoist assembly as shown in FIGS. 3 and 15. The crane and hoist assembly is mounted in the keel depending portion 58 and it includes an electric motor 129 which is fixedly secured in place by any suitable means to the inside of the hull structure 58. The motor 129 drives a suitable gear reduction means 130 which in turn drives a suitable cable reel or spool 131. Operatively mounted on the spool 131 is a cable 132 which is provided with a suitable hook or grappling means 133. The cable 132 is adapted to be moved downwardly out of the keel member 58 through the opening 134 in the keel portion 58. The opening 134 is adapted to be enclosed by a suitable hatch or door 135 which is adapted to be held in the open position by means of the hinged spring 136 or any other suitable means.

Figure 9:
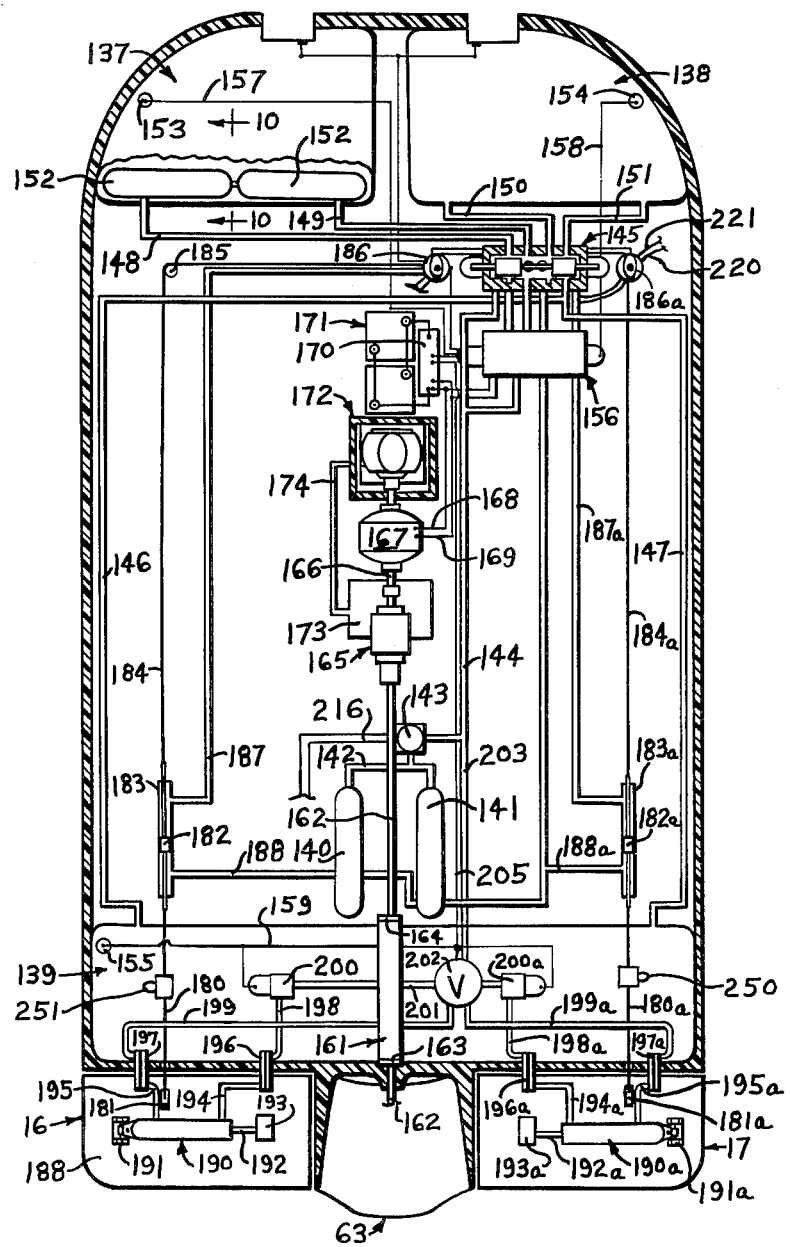
FIG. 9 is a horizontal sectional view of the vehicle illustrated in FIG. 4, taken substantially along the line 9—9 thereof, looking in the direction of the arrows, and showing the propulsion and control systems with the internal hull structure removed.

In order to vary the ballast of the vehicle to positive or negative conditions, a system of pneumatic ballast is designed into the hull. The ballast system of the vehicle is based on the principle that if two points balance a line, then three points determine the existence and position of a spatial plane. In applying this principal to the underwater balance system for the vehicle, a minimum of three ballast tanks are provided to level or orient the vehicle. As shown in FIG. 9, the vehicle includes forwardly disposed port and starboard ballast tanks 137 and 138, and the aft or rear ballast tank generally indicated by the numeral 139. The aft tank 139 may be termed the main ballast tank. The ballast tanks 137, 138 and 139 are fed by a network of pneumatic lines from a plurality of high pressure cylinders as indicated by the numerals 140 and 141 which are located centrally along the hull and toward the aft end thereof. As shown in FIG. 9, the ballast supply tanks or cylinders 140 and 141 are adapted to contain a suitable compressible fluid as carbon dioxide or nitrogen. If the ballast tanks 140 and 141 are provided with air, they may also be used for a breathing source of air for the operators or divers using the vehicle. As shown in FIG. 9, the tanks 140 and 141 are connected by means of the conduit 142 to the three-way flow control valve 143. The valve 143 is then connected by means of the conduit 144 to the manual main flow control valve and manifold generally indicated by the numeral 145 which may be of any suitable type. The main ballast tank 139 is connected by means of the conduits 146 and 147 to the flow control valve 145. The port ballast tank 137 is connected by means of the conduits 148 and 149 to the flow control valve and manifold 145. The starboard tank 138 is connected by means of the conduits 150 and 151 to the flow control valve and manifold 145.

The control means 145 is illustrated as located on the starboard side of the vehicle and is operated as more fully described hereinafter. The control means 145 is adapted to permit the user to open or close individually or plurally actuate the three ballast tanks 137, 138 and 139.

The ballast tanks 137, 138 and 139 are designed from laminated rubber and are provided with plastic inner sacks that inflate with the ballast fluid and which are indicated by the numerals 152. The plastic inner sacks 152 are illustrated in FIGS. 9 and 10. The inner sacks 152 are connected to the exhaust member 61 which extends downwardly from the hull 10 and terminates in the hollow skid member 62 by means of the conduit 216 whereby the ballast is discharged backwardly over the bottom of the shroud 63.

A plurality of holes as 217 formed in the conduits 95 and 95a allow the forward ballast tanks 137 and 138 to exchange the pressurized volume of air in the inner sacks 152 for ambient pressure of water at any particular depth. The water passes overboard from the ballast tanks 137 and 138 through the conduits 95 and 95a. The aft ballast tank 139 is similarly in communication with the water surrounding the vehicle by means of a plurality of ports 218 formed through the hull lower surface 57 adjacent the aft end thereof.

Also incorporated into the ballast system is a static balance mechanism that circulates a given amount of pressurized air to the three ballast tanks so that the submarine can automatically level itself when the weight is shifted or taken out of one of the cockpits 11 or 12. The static balance mechanism comprises the three pressure point sensing devices 153, 154 and 155 which are adapted to send an electrical impulse to the automatic flow control servo-valve and manifold generally indicated by the numeral 156. The sensing devices 153, 154 and 155 are connected by suitable electric wires to the manifold 156 and these wires would be carried in suitable wiring jackets indicated by the numerals 157, 158 and 159. It will be understood that the wiring jackets 157, 158 and 159 are shown in FIG. 9 as a single line, but that they will also carry the wiring for the other electrical devices as more fully explained hereinafter. The change in the depth of the water at any of the pressure points will actuate the servo-valves in the manifold 156 for operating the flow control ballast system. One of the purposes for the static balance mechanism is a means for holding the vehicle under water at a preset depth, even though the diver may not be there to control it.

As shown in FIG. 19, the vehicle is provided with a spiral propeller generally indicated by the numeral 160. The propeller 160 is operatively mounted in the propeller shroud 63 and is rotatably supported by the shaft 162 mounted in the propeller shaft housing generally indicated by the numeral 161. As shown in FIG. 9, the propeller shaft 162 is rotatably mounted in the housing 161 in suitable seal and bearing means such as 163 and 164. As shown in FIG. 9, the propeller shaft 162 is operatively connected to the output end of a suitable gear reduction means generally indicated by the numeral 165.

The gear reduction means 165 is connected by means of a suitable drive-shaft 166 to an electric drive motor 167. The drive motor 167 is connected by the lead wires 168 and 169 to the terminal box 170 which is operatively connected to the batteries generally indicated by the numeral 171. The electric motor 167 may be submersed in a suitable housing containing a fluid that will not conduct an electric current. The numeral 172 generally indicates an alternate main drive engine such as an internal combustion engine or suitable gas turbine which could be used to recharge the batteries 171 when the vehicle is surfaced and also for surface propulsion. The fuel tank 173 for the engine 172 would be mounted in the hull 10 and operatively connected to the engine by a suitable conduit as 174.

As shown in FIGS. 18 and 19, the propeller shroud 63 is provided with a plurality of flow control vanes 175 which are adapted to be operated from the cockpits 11 and 12 by means of a control cable 176. The control vanes 175 function as vertically disposed rudders that turn the vehicle on a vertical axis. There is also a horizontal rudder 178 and it is moved about a horizontal axis 179 by means of the cable 177. The cable 176 is used to move each of the rudders or vanes 175 about its vertical axis.

Stability and good handling qualities are maintained throughout all the maneuvers and speed ranges by use of an elevon control system, which is operatively connected to the horizontal and vertical vanes. The word "elevon" as used in delta wing aircraft consists of two control surfaces on the trailing edge of the wings acting as a combination of the elevator and aileron. Thus they can be operated either differentially, tending to roll the craft about its longitudinal axis, or as a unit pair tending to increase or decrease the angle of attack. The elevon control system in the vehicle of the present invention replaces several conventional control surfaces and related mechanisms such as the traditional forward and aft horizontal diving planes and the vertical rudder. The elevon control system consists of the two flap sections generally indicated by the numerals 16 and 17. They are independent of each other and permit the operator complete freedom for selecting the vehicle, rotation or turning rate. For example, both elevons can be depressed for straight frontal diving or maneuvering.

As shown in FIG. 9, an operating cable 180 has the rear end thereof fixedly connected to the elevon 16 at the point 181 and the front thereof fixedly connected to the pneumatic piston 182 in the cylinder 183. The piston 182 is further connected to another cable 184 which passes around the pulley 185 and thence is connected to the control handle 186. The elevon 16 can thus be manually controlled by the control handle 186. The elevon 16 can further be controlled by the automatic pressurized fluid which is conducted to the cylinder 183 by means of the conduits 187 and 188 which are connected to the flow control valve 145. The elevon 17 is connected by similar cables, conduit and control structure and these similar parts are marked with corresponding reference numerals followed by the small letter "a."

The vehicle of the present invention is provided with a hydrobrake and it is adapted to stop the vehicle when traveling at relatively high speeds or when it is necessary to abruptly change the previous course. The stop is accomplished by opening the elevons 16 and 17, or drag flaps, which when opened generate cavitation and high drag forces by obstructing the flow or streamlines of the water as it passes over the vehicle hull. As shown in FIGS. 20 and 9, the elevon 16 comprises the upper portion 187 and the lower portion 188 which are hingedly mounted at the forward ends thereof on the transverse shaft 189. The elevon portions 187 and 188 are adapted to be moved from the closed position shown in FIGS. 4 and 17 to the open position shown in FIG. 20 by means of the fluid cylinder generally indicated by the numeral 190. As shown in FIG. 9, the lower portion 188 of the elevon is shown as supporting the cylinder 190. The cylinder is connected by any suitable means as by the trunnion 191 to the elevon portion or blade 188. The cylinder rod 192 is adapted to be connected by a suitable trunnion 193 to the upper elevon portion 187. Fluid under pressure is conducted to the opposite ends of the cylinder 190 for pressure on the cylinder piston by means of the conduits 194 and 195. The conduits 194 and 195 are connected by means of suitable rotating sealed couplings 196 and 197 to the conduits 198 and 199. The conduit 198 is connected to a suitable solenoid operated valve 200 which is in turn connected by the conduit 201 to the pressure regulating valve 202 and thence by means of the conduits 144 and 203 to the manifold 156. It will be seen that when the solenoid valve 200 is operated to admit a fluid to either end of the cylinder 190, the cylinder will be operated to open or close the elevon portions 187 and 188 as desired. FIG. 20 shows the elevon portions in the open or brake positions. The elevon 17 is provided with similar operating means and the corresponding structure is marked with similar reference numerals followed by the small letter "a." The brake cylinders 190 and 190a are properly oriented to maintain the outer configuration of the elevons. The solenoids in the solenoid valves 200 and 200a are connected to the brake switch generally indicated by the numeral 204 as shown in FIG. 22 by means of the suitable wiring means in the wiring jacket 159 and wiring jacket 205 as shown schematically in FIG. 9.

FIGS. 21, 22, 23, and 32 show a unified control handle of the type adapted to function as the control handles or members 186 and 186a. The function of the control members 186 and 186a is to provide a control means for a totally sealed rheostat type electrical control apparatus for controlling the speed and rotational directions of the main drive motor 167. The control handle 186a includes the base member 206 which is mounted in the control panel 76. Rotatably mounted on the base member 206 is a tubular handle 207 which is serrated to provide an optimum grip for turning the same. The handle member 207 is fixed against longitudinal movement and may be rotated for control purposes as more fully described hereinafter. Threadably mounted on the inside of the handle member 207 is an outer tubular magnet 208 which is separated from the inner tubular magnet 209 by means of the sealed outer post 210 fixedly mounted on the base member 206. The outer post 210 is fixedly mounted in the handle knob 211. When the handle portion 207 is turned, it moves the outer magnet 208 upwardly and downwardly in line with the inner threads of the handle 207. The inner magnet 209 is separated from the outer magnet 208 by the outer post 210 providing a total seal for the inner cavity containing the magnet 209. There is a magnetic linkage between the outer magnet 208 and the inner magnet 209. As these magnets are traversed, the slider contact 212 moves along the positive contact slider 213 and therein changes the resistance of the rheostat by means of the second slider contact 214 on the rheostat 215 on the inner post 219.

The purpose of this mechanism is to provide a speed control for the main drive motor 167. The control handle 186 is constructed similarly and is adapted to control the rotational direction of the main drive motor 167. The lead wires 220 and 221, as shown in FIGS. 22 and 32, would be connected to the main drive motor 167 for controlling the speed of this motor in the usual manner. The control handle 186 would have its similar lead wires also connected to the main drive motor 167 in the usual manner for controlling the rotational direction of that motor.

As shown in FIGURES 21 and 22, the numeral 222 indicates a conventional push button switch which may be adapted to function as an "on-off" switch for any of the accessories on the vehicle, as for example, the cable lift and torpedo firing mechanisms.

The control handles 186 and 186a are adapted to control the steering mechanism of the vehicle by the following described structure. As shown in FIGS. 22 and 23, a fixedly mounted yoke 223 is mounted on the lower side of the handle base member 206. The yoke member 223 is provided with a pair of spaced apart downwardly extended legs 224 and 225 which are rotatably mounted on the horizontal cross-shaft 226. The shaft 226 is held in operative position relative to the yoke legs 224 and 225 by means of the conventional retainer clip rings 227 and 228, respectively. As best seen in FIG. 23, a handle cradle 229 is disposed between the yoke legs 224 and 225. The cradle is provided with the hole 230 therethrough, through which is mounted the cross-shaft 226. The handle 186a is releasably locked to the handle cradle 229 by means of the lock pin 232 which is provided with the enlarged head 233 on the lower end thereof that is disposed in the recess 231 formed in the upper end of the cradle 229.

As shown in FIG. 22, a spring 234 is disposed in the recess 231 below the enlarged lock pin head 233 to normally bias the lock pin 232 upwardly into locking engagement with the handle 186a. The handle base member 206 is provided with the axial vertical passageway 236 in the lower end of which is mounted the bearing member 235. The locking pin 232 is adapted to be slidably mounted into the lower end of the bearing 235, as shown in FIG. 22. The locking pin 232 is adapted to be released from the base member 206 by means of a drive rod 237. The rod 237 extends axially through the handle 186 and the lower end of it is adapted to abut the upper end of the release pin 232 and move it downwardly against the pressure of the spring 234 to disengage this pin from the base member 206. Release rod 237 extends downwardly through the tubular inner post 219 and into the axial passageway 237 in the base member 206.

As shown in FIG. 22, the upper end of the release rod 237 is slidably mounted in the bearing member 242 which is disposed in the axial passage 243 in the handle knob 211. The release rod 237 is provided on the upper end thereof with the enlarged head 238 which is disposed in the recess 239 which communicates with the passageway 243. A spring 240 is disposed in the recess 239 and engages the release rod head 238 and biases the same upwardly against the shoulder surrounding the upper end of the recess 239. A release button 240 with proper seals is formed on the upper outer side of the release rod enlarged head 238 for manually moving the release rod 237 downwardly against the pressure of spring 240. As shown in FIGS. 22 and 23, the handle cradle 229 is rotatably mounted to the hull of the vehicle by means of the shaft 244 which is fixedly secured to the cradle 229 by means of the lock nuts 245. The cradle 229 has a transverse hole 246 formed through the lower end thereof for the reception of the elevon control cable 184a. Cable 184a may be fixed in the holes 246 by any suitable means as by means of the set screw 247.

The starboard control handle 186 changes the steering position of the starboard elevon 17 by rotating this handle about the shaft 244 so as to move the elevon control cable 184a forwardly and backwardly in accordance with the movement of the handle 186a. That is when the control handle 186a is moved forwardly or in the clockwise position as viewed in FIG. 23, the elevon control cable 184a will be moved rearwardly so as to lower the elevon 17. When the control handle 186a is moved counter-clockwise as viewed in FIG. 23, or backwardly, the control cable 184 will be moved forwardly so as to elevate the elevon 17 or change the angular position. The control handle 186 functions in the same manner to operate the port elevon control cable 184 to change the steering angle or position of the port elevon 16.

The control handles 186 and 186a are adapted to provide lateral turning or steering of the vehicle about the longitudinal axis of the same by operating these handles in the following described manner either simultaneously or separately as called for by required maneuvers. The control handle 186 is adapted to control the admittance or exhaust of ballast fluid into and out of the starboard forward ballast bladder 138 by the following described steps. The operator grasps the control handle 186a and depresses the release button 241 with his thumb which causes the release rod 237 to move downwardly and unlock the lock pin 232 from the base member 206. The operator then tilts or moves the control handle 186a to the right as viewed in FIG. 22 so as to pivot the handle about the shaft 226 in a clockwise direction as viewed in FIG. 22. The clockwise rotation of the control handle 186a will cause the base member 206 to engage a conventional three-position micro-switch indicated by the numeral 248. The micro-switch 248 is adapted to operate the conventional solenoid or servo-valve device disposed in the control manifold 156 for operating the valve spools to control the flow of ballast fluid to the starboard forward ballast tank 138. As shown in the position of FIG. 22, the micro-switch 248 would be in the first or "off" position. As the control handle 186a is moved to the right, the first positional control contacts are engaged so as to operate the proper servo controls to admit fluid into the ballast tank 138. In order to exhaust the fluid from the starboard ballast tank 138, the control handle 186a is moved further to the right or clockwise as viewed in FIG. 22. The third or final positional control contacts are engaged for operating the proper servo control mechanism to exhaust the ballast fluid from the starboard ballast tank 138. The control handle 186 is adapted to operate a similar micro-switch for controlling the admittance and exhaust of ballast fluid into and out of the port forward ballast tank 137.

Each of the control handles 186 and 186a is adapted to operate a second micro control switch 249 which is disposed to the inward side of each of these control handles. These micro-switches 249 are adapted to control suitable solenoids or servo control mechanisms in the control manifold 156 for controlling the admittance and exhaust of fluid control ballast into the aft ballast control tank 139. As shown in FIG. 22, the micro-switch would be in the first or "off" position. As the control handles 186 and 186a are moved from the vertical or inactive position inwardly toward each other, they engage the micro-switches 249 and operate the first positional electrical contacts for operating the proper control mechanism for admitting ballast fluid into the aft ballast tank 139. Continued inward movement toward each other will cause the control handles 186 and 186a to operate the third or final positional electrical contacts in the micro-switches 249 for operating the proper control system mechanism for exhausting fluid from the aft ballast tank 139.

FIG. 33 illustrates a means for operating the horizontal rudder 178. As stated hereinbefore, the horizontal rudder 178 is adapted to be moved upwardly and downwardly about the pin joint 179 by means of the cables 177. The horizontal rudder 178 is provided with clearance slots for the reception and operation of the vertical rudders 175. The numeral 250 generally indicates a solenoid clutch or grappling device which is carried on the cable 177 and functions to grasp the elevon control cable 184a at desired times to move the rudder 178. The solenoid clutch 250 may be any suitable conventional clutch. It will be seen that when the elevon control cable 184 is moved forward or rearwardly, by means of the control handle 186a, the solenoid clutch 250 may be energized by any suitable manually operated switch to connect the rudder control cable 177 to the elevon control cable 184a for operating the rudder 178. A similar solenoid clutch 251 would be mounted on the control cable 176 which operates the vertical rudders 175. FIG. 9 also includes an illustrative position of the solenoid clutches 250 and 251 engaging the control cables 176 and 177.

The solenoid clutches 250 and 251 are normally used when the vehicle is running on the surface for steering purposes and also for when it is running under water at slow speeds.

FIGS. 24 to 31 and FIG. 34 show a second embodiment of the invention. The vehicle of the second embodiment incorporates the same overall configuration of the first embodiment with the exception of certain modifications in the canopy and top deck structure. A further difference between the two embodiments of the invention is that the second embodiment is provided with a plurality of hydrofoils. In this second embodiment the canopy structure and the top deck structure function to enclose the cockpits of the vehicle.

The parts of the second embodiment which are the same as the parts of the first embodiment are marked with the same reference numerals followed by the small letter "b." The major structure of the controls and internal systems of the second embodiment are the same as the first embodiment.

As shown in FIGS. 24 and 25, the canopies 14b and 15b are fixedly and flushly mounted in the top deck 56b which extends rearwardly to the elevons 16b and 17b. The cockpits 11b and 12b are each provided with a longitudinally extended side window, as the port side window 252 shown in FIGS. 24 and 27. The cockpits 11b and 12b are provided with entrance hatches generally indicated by the numerals 253 and 254. The hatch 253 comprises the pair of hingedly mounted cover members 255 and 256 which are each provided with a window as indicated by the numerals 257 and 258. The hatch 254 comprises a similar pair of hingedly mounted cover members 259 and 260 which are each provided with a window as indicated by the numerals 261 and 262. The hatch cover members are each hinged along their outer sides. The starboard hatch 253 is shown in FIG. 24 in the open position. As shown in FIG. 24, each of the hatches 253 and 254 are provided with suitable forward and aft water shields as indicated by the numerals 263 and 264, respectively.

The water shields may be made from any suitable transparent material and are disposed between the hatch covers in the operative position and extend above the top deck 56b. The water shields may be mounted in any suitable manner as for example they may be made collapsible or roll outwardly from the hull on a suitable track means. The water shields 263 and 264 are provided for surface operation to protect the operator of the vehicle when the top deck 56b is awash. As shown in FIG. 24, a pair of tow eyelets 265 and 266 are flush mounted in the aft end of the top deck 56b on the starboard and port sides, respectively. A pair of suitable view finders 267 and 268 are mounted on the hatches 253 and 254.

As shown in FIGS. 25, 26 and 27, the operator of the modified vehicle of the second embodiment is disposed in the cockpit 11b or 12b in a reclining position in a suitable chair or seat. The numeral 269 generally indicates an adjustable seat for the operator in the port cockpit 12b. The seat 269 includes the back rest portion 270 which is provided with the head rest portion 271. The lower end of the back rest portion 270 is hinged to the brackets 272 and 273 which are fixedly mounted on the cockpit floor deck 274. The back rest portion 270 and the head rest portion 271 are adjustable as shown by the adjusted dotted line positions of FIG. 25.

The seat 269 further includes the inverted U-shaped body portion 274 which is provided with upper leg extensions along the forward sides of the cockpit on each side of an instrument bay 279. Hingedly connected to the body extensions are a pair of lower leg rest portions 275 and 276 which have the forward ends thereof pivoted on a slidable pin as 280 which is mounted in a track as 281. The track 281 is fixedly mounted to the cockpit floor deck 274. The numerals 277 and 278 indicate foot rests which are carried on the ends of the leg rest portions 275 and 276, respectively. The foot pedals 282 and 283 are operatively mounted on the foot rests 277 and 278, respectively, and are adapted to operate accessories, as desired. The numerals 284 and 285 indicate a pair of instrument gage boards which are hingedly mounted on the opposite sides of the instrument bay 279. These gage boards are adapted to be swung to an inoperative or rest position on the sides of the instrument bay 279.

The control handles for the second embodiment of FIGS. 25 through 28 are marked with the general reference numerals 286 and 287 for the port cockpit 11b and the starboard cockpit is provided with similar control handles. An enlarged detailed view of the control handle 286 is shown in FIG. 28. The control handles 286 and 287 are constructed to operate in substantially the same manner as the control handles 186 and 186a and the similar parts have been marked with the same reference numerals followed by the small letter "b." The grip portion 207b is disposed at an angle to the rotatable shaft 288 which is mounted in the hull 10b. The handle locking structure which is released by the button 241b in the same manner as in the control handle 186a is merely adjusted to function between the handle grip portion 207b and the shaft 288. The shaft 288 is adapted to rotate in the suitable bearing members 289 and 290. A pulley 291 is fixedly mounted on the lower end of the shaft 288 and this pulley serves the same function as the cradle 229 of the control handle 186a. The elevon control cables 184 and 184a would be wound around the pulley 291 at least two times in order to make the cables move when the shaft 288 is rotated.

As shown in FIG. 24, each of the cockpits is provided with a standard marine air bleed valve as indicated by the numeral 292. The hatch cover members may be provided with a suitable manually operated lock as indicated by the numeral 293 in FIG. 25.

Directly aft of the right shoulder of the operator in the port cockpit 11b is a periscope means including the periscope 294 comprising a plurality of telescopically connected parts which are in turn adapted to be seated in an inoperative position in the telescope well 295 mounted the hull of the vehicle. The numeral 296 indicates a high pressure gas tank connected by means of the solenoid operated flow control valve 297 for providing a pressurized fluid in the well 295 for extending the periscope outwardly to the position as shown in FIG. 24. The solenoid controlled valve 297 being operated by the operator through a suitable manual control means.

As shown in FIGS. 25, 26 and 29, the numeral 298 generally indicates an overhead eye piece housing which holds the necessary lenses and mirrors for looking up and through the periscope. The eyepiece 298 is connected to the stationary square conduit 299 which is secured to the well 295. Slidably mounted on the outer end of the conduit 299 is the inner portion 300 of the eyepiece 298. Hingedly mounted at the point 301 to the inner portion 300 is the outer portion 302 of the eyepiece 298. The numerals 303 and 304 indicate suitable latch members for releasable locking of the two eyepiece portions together for use of the same. Numerals 305 and 306 indicate the necessary lenses and mirrors for viewing objects through the periscope. The numerals 307 and 308 indicate control knobs for actuating the adjusting mechanism of the periscope shown in FIGS. 30 and 31.

When the knob 307 is operated it provides the control for rotating the periscope mechanism about the "Y" axis as shown in FIG. 31. When the knob 308 is operated it provides the control for rotating the periscope mechanism about the "Z" axis. The periscope mechanism controlled by the knobs 307 and 308 is generally indicated in FIGS. 24, 25 and 30 by the numeral 309.

The periscope mechanism 309 comprises the sealed housing 310 which is fixedly mounted on the upper end of the periscope tube 294 and in which is rotatably mounted the carrier ring 311 on the bearing 312. Fixed on the ring 311 at an angle from the vertical plane is a mounted plate 313 on which is mounted the periscope mirror 315 adjustment, and ring 311 adjustment, and motor 314.

The mirror 315 is hinged at the lower end thereof to the ring 311 and is adjustable about the ring mounted on the "Z" axis by the following means. The motor 314 is operatively connected to a suitable gear reduction and clutch means indicated by the numeral 316. Rotatably attached to the rear side of the mirror 315 is a threaded shaft 317 which passes through the ball joint 318 mounted in the plate 313. Threadably mounted on the rear end of the shaft 317 is the driven gear 319 which is driven by the drive gear 320. The gear 320 is operatively connected to one of the output shafts of the gear reduction and clutch means 316.

As shown in FIGS. 30 and 31, rotation of the ring 311 about the "Y" axis is obtained by means of the universal joint member 321 and 322. The universal joint member 321 is operatively connected to a second output shaft of the gear and clutch means 316 and the other universal joint member 322 is fixed on the upper wall 323 of the periscope mechanism 309. The control knobs 307 and 308 are suitably electrically connected to the control clutches for the output shafts of the gear 320 and the universal joint member 322 by means of a suitable circuit including the terminal box 326, the lead wire jacket 325 and the slider contacts 324. The sealed housing wall 310 is transparent and is provided with calibrated markings in the vertical and horizontal axes, as shown in FIG. 30. The mirror may also be inscribed with markings to indicate the position of sighting through the periscope.

As shown in FIGS. 24, 25, 27 and 34, the vehicles of the present invention may be provided with suitable hydrofoils on the front and aft ends thereof. The numeral 327 generally indicates a full beam width type hydrofoil which is fixed to the lower side of the vehicle hull by means of the struts 328. The numerals 329 and 330 generally indicate V-type hydrofoils. These hydrofoils are fixed to opposite sides of the hull by means of the struts 331 and 332, respectively.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a stream-lined longitudinal side configuration; a component compartment on said hull; a pair of longitudinally disposed cockpits being formed in said hull on opposite sides of the component compartment; and, steering means operatively mounted solely on the rear end of the hull and including a pair of laterally spaced apart members for simultaneous or independent upward and downward movements.

2. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a centrally disposed, longitudinally extended component compartment; a longitudinally disposed cockpit formed in said hull on each side of said component compartment; and, steering means operatively mounted solely on the rear end of the hull and including a pair of laterally spaced apart members for simultaneous or independent upward and downward movements.

3. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a centrally disposed, longitudinally extended component compartment; a longitudinally disposed cockpit formed in said hull on each side of said component compartment; propulsion means mounted in said component compartment for propelling the vehicle; and, steering means operatively mounted solely on the rear end of the hull and including a pair of laterally spaced apart members for simultaneous or independent upward and downward movements.

4. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said compartment; propeller means operatively mounted on the rear end of the hull; power drive means mounted in said component compartment and being drivably connected to said propeller means for propelling the vehicle; and, steering means operatively mounted solely on the rear end of the hull and including a pair of laterally spaced apart members for simultaneous or independent upward and downward movements.

5. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means mounted in said component compartment for propelling the vehicle; and, steering means operatively mounted solely on the rear end of the hull and including a pair of laterally spaced apart members for simultaneous or independent upward and downward movements.

6. A submersible vehicle, comprising: a hull having a substantially rectangular plan form with the longer axis thereof being disposed longitudinally of the vehicle; said hull being provided on each side thereof with a wing-shaped side elevation form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means operatively mounted in the hull for propelling the vehicle; and, steering means operatively mounted solely on the rear end of the hull and including a pair of laterally spaced apart members for simultaneous or independent upward and downward movements.

7. A submersible vehicle, comprising: a hull having a substantially rectangular plan form with the longer axis thereof being disposed longitudinally of the vehicle; said hull being provided on each side thereof with a wing-shaped side elevation form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means mounted in said component compartment for propelling the vehicle; said hull having a control compartment on the bottom side thereof extending under said component compartment and cockpits; and, steering means operatively mounted solely on the rear end of the hull and including a pair of laterally spaced apart members for simultaneous or independent upward and downward movements.

8. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means mounted in said component compartment for propelling the vehicle; said hull having a control compartment on the bottom side thereof extending under said component compartment and cockpits; said hull including a centrally disposed longitudinally extended keel depending from the bottom surface of the hull at a point spaced rearwardly from the front end of the vehicle and extending rearwardly to a point adjacent the rear end of the vehicle; and, steering means operatively mounted solely on the rear end of the hull and including a pair of laterally spaced apart members for simultaneous or independent upward and downward movements.

9. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means mounted in said component compartment for propelling the vehicle; said hull including a supporting frame formed from a plurality of interconnected longitudinal, transverse and diagonal tubular members; said supporting frame being enclosed by an outside covering; and, steering means operatively mounted solely on the rear end of the hull and including a pair of laterally spaced apart members for simultaneous or independent upward and downward movements.

10. The submersible vehicle as defined in claim 9, wherein: said outside covering comprises a shell of fiberglass impregnated with resin.

11. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means mounted in said component compartment for propelling the vehicle; said hull having a control compartment on the bottom side thereof extending under said component compartment and cockpits; a ballast system mounted in said control compartment; and, steering means operatively mounted solely on the rear end of the hull and including a pair of laterally spaced apart members for simultaneous or independent upward and downward movements.

12. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means operatively mounted in the hull for propelling the vehicle; steering means operatively mounted solely on the rear end of the hull including a port elevon and a starboard elevon, and said elevons being swingably mounted on the rear end of the hull for simultaneous or independent upward and downward movements.

13. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; said hull including at least one window disposed under each of said cockpits to permit an operator in each of the cockpits to look vertically downwardly beneath the vehicle; propulsion means operatively mounted in the hull for propelling the vehicle; and, steering means operatively mounted solely on the rear end of the hull and including a pair of laterally spaced apart members for simultaneous or independent upward and downward movements.

14. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; said hull being provided with a pair of adjustable headlights; propulsion means operatively mounted in the hull for propelling the vehicle; and, steering means operatively mounted solely on the rear end of the hull and including a pair of laterally spaced apart members for simultaneous or independent upward and downward movements.

15. A submersible vehicle, comprising: a hull having a substantially rectangular plan form with the longer axis thereof being disposed longitudinally of the vehicle; said hull being provided on each side thereof with a wing-shaped side elevation form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means operatively mounted in the hull for propelling the vehicle; steering means operatively mounted solely on the rear end of the hull including a port elevon and a starboard elevon, said elevons being swingably mounted on the rear end of the hull for simultaneous or independent upward and downward movements; each of said elevons comprising an upper and a lower portion which are normally disposed in engagement with each other; and, power means for swinging said elevon portions from the normal engaging position to a spaced apart position to provide a hydro-braking means for the vehicle.

16. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means mounted in said component compartment for propelling the vehicle; said hull having a control compartment on the bottom side thereof extending under said component compartment and cockpits; a ballast system mounted in said control compartment; steering means operatively mounted solely on the rear end of the hull; said steering means including a port elevon and a starboard elevon, said elevons being swingably mounted on the rear end of the hull for simultaneous or independent upward and downward movements; each of said elevons comprising an upper and a lower portion which are normally disposed in engagement with each other; and, power means for swinging said elevon portions from the normal engaging position to a spaced apart position to provide a hydro-braking means for the vehicle.

17. A submersible vehicle as defined in claim 16, wherein: control means is mounted in said control compartment and at least one of said cockpits for manual operation of said propulsion, steering, ballast, headlights and hydro-brake means.

18. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means mounted in said component compartment for propelling the vehicle; said hull having a control compartment on the bottom side thereof extending under said component compartment and cockpits; said hull including a centrally disposed longitudinally extended keel depending from the bottom surface of the hull at a point spaced rearwardly from the front end of the vehicle and extending rearwardly to a point adjacent the rear end of the vehicle; a hoist assembly mounted in said keel; means for operating said hoist assembly; and, steering means operatively mounted solely on the rear end of the hull and including a pair of laterally spaced apart members for simultaneous or independent upward and downward movements.

19. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means mounted in said component compartment for propelling the vehicle; said hull having a control compartment on the bottom side thereof extending under said component compartment and cockpits; said hull including a centrally disposed longitudinally extended keel depending from the bottom surface of the hull at a point spaced rearwardly from the front end of the vehicle and extending rearwardly to a point adjacent the rear end of the vehicle; said keel being provided with at least one weapon compartment; and, steering means operatively mounted solely on the rear end of the hull and including a pair of laterally spaced apart members for simultaneous or independent upward and downward movements.

20. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means operatively mounted in the hull including a propeller for propelling the vehicle; said hull including a shroud formed around said propeller; steering means operatively mounted solely on the rear end of the hull including a port elevon and a starboard elevon, said elevons being swingably mounted on the rear end of the hull for simultaneous or independent upward and downward movement; and, adjustable flow control vanes mounted in said shroud.

21. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means operatively mounted in the hull for propelling the vehicle; steering means operatively mounted solely on the rear end of the hull; and, said hull and including a pair of laterally spaced apart members for simultaneous or independent upward and downward movements being provided with hydrofoil means.

22. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means mounted in said component compartment for propelling the vehicle; said hull being provided with at least one swingably mounted canopy means for enclosing the forward end of said cockpits; and, steering means operatively mounted solely on the rear end of the hull and including a pair of laterally spaced apart members for simultaneous or independent upward and downward movements.

23. A submersible vehicle as defined in claim 22, wherein: each of said cockpits is provided with an adjustable chest rest pad in the forward end thereof.

24. A submersible vehicle as defined in claim 22, wherein: said vehicle includes a plurality of conduits in said hull for conveying fluid into the cockpits at the front ends thereof and below the canopy.

25. A submersible vehicle as defined in claim 22, wherein: said vehicle includes a control panel mounted in the forward end of at least one of said cockpits.

26. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded in the vertical plane and the overall height of the hull being a maximum at the forward end thereof and tapering toward the rear end to a minimum height to provide a streamlined longitudinal side configuration; said hull including a component compartment; a longitudinally disposed cockpit being formed in said hull on each side of said component compartment; propulsion means mounted in said component compartment for propelling the vehicle; said hull being provided with a top deck which encloses said cockpits, a hatch formed in said top deck for entrance to each of said cockpits; and, steering means operatively mounted solely on the rear end of the hull and including a pair of laterally spaced apart members for simultaneous or independent upward and downward movements.

27. A submersible vehicle, as defined in claim 26, wherein: said vehicle is provided with a periscope mounted in at least one of said cockpits and extendable outwardly of said hull.

28. A submersible vehicle as defined in claim 26, wherein: said vehicle is provided with an instrument bay centrally located in the forward end of at least one of said cockpits and a pair of instrument gauge boards which are hingedly mounted on opposite sides of the instrument bay.

29. A submersible vehicle as defined in claim 26, wherein at least one of said cockpits is provided with an adjustable seat with adjustable leg portions disposed on opposite sides of said instrument bay.

30. A submersible vehicle as defined in claim 26, wherein: as least one of said cockpits is provided with a view finder.

31. A submersible vehicle, comprising: a hull having a substantially rectangular plan form with the longer axis thereof being disposed longitudinally of the vehicle; said hull being provided on each side thereof with a wing-shaped side elevational form with the front end of the hull being rounded and the overall height of the hull being a maximum at the forward end thereof and tapering toward the rear end to a minimum height to provide a streamlined longitudinal side configuration; a pair of longitudinally extended, laterally spaced apart cockpits formed in said hull; said hull including a centrally disposed, longitudinally extended component compartment between said cockpits and extended throughout the length of said cockpits; a ballast system mounted in said hull including a plurality of tanks having openings to the exterior of the hull, at least one inflatable sack mounted in each of said tanks, a source of pressurized ballast fluid, conduit means connecting the sacks in each of said tanks to said source of pressurized ballast fluid, and control means for selectively controlling the flow of pressurized ballast fluid through said conduit means to said sacks; and, steering means operatively mounted on the rear end of the hull.

32. A submersible vehicle as defined in claim 31, including: propulsion means mounted in said component compartment for propelling the vehicle.

33. A submersible vehicle as defined in claim 31, wherein: said ballast system includes at least three tanks with two of the tanks being disposed in the forward end of the hull on the port and starboard sides of the hull and the third tank being centrally disposed in the rear end of the hull.

34. A submersible vehicle as defined in claim 31, wherein: said control means for selectively controlling the flow of pressurized ballast fluid through said conduit means to said sacks includes a manually operated control means for admitting pressurized ballast fluid into the sacks and for exhausting said fluid from the sacks.

35. A submersible vehicle as defined in claim 31, wherein: said control means for selectively controlling the flow of pressurized ballast fluid through said conduit means to said sacks includes a static balance mechanism that circulates pressurized ballast fluid to the sacks in the ballast tanks to automatically level the vehicle when weight is shifted or taken out of the cockpits.

36. A submersible vehicle as defined in claim 35, wherein: said static balance mechanism includes a plurality of pressure sensing devices, said control means includes an automatic flow control servo valve means, and said pressure sensing devices are adapted to send signals to the servo valve means for operating the same to maintain the vehicle under water at a preset depth.

37. A submersible vehicle as defined in claim 31, including: propeller means operatively mounted on the rear end of the hull; and, power drive means mounted in said component compartment and being drivably connected to said propeller means for propelling the vehicle and being operable from said cockpits.

References Cited by the Examiner

UNITED STATES PATENTS

| | | | |
|---|---|---|---|
| 1,359,513 | 11/1920 | Leathers | 114—16 X |
| 1,784,500 | 12/1930 | Spear | 114—51 X |
| 2,371,404 | 3/1945 | Mumford | 9—10 |
| 2,612,329 | 9/1952 | Crandall et al. | 244—42 |
| 2,616,101 | 11/1952 | Tym | 9—6 |
| 2,720,367 | 10/1955 | Doolittle | 9—6 |
| 2,980,047 | 4/1961 | Korganoff et al. | 114—16 |
| 2,987,893 | 6/1961 | Robinson | 114—16 |
| 3,040,527 | 6/1962 | Christensen et al. | 115—12 X |
| 3,051,114 | 8/1962 | Bajulaz | 114—16 |
| 3,131,664 | 5/1964 | McInvale | 114—16 |
| 3,204,596 | 9/1965 | Fallon | 114—16 |

OTHER REFERENCES

Yachting publication, vol. 102–No. 5, November 1957 (p. 6).

Popular Mechanics publication, September 1946, pp. 120, 121.

MILTON BUCHLER, *Primary Examiner.*

FERGUS S. MIDDLETON, *Examiner.*

T. M. BLIX, *Assistant Examiner.*